United States Patent
Leiter et al.

(10) Patent No.: US 8,322,495 B2
(45) Date of Patent: Dec. 4, 2012

(54) HYDRAULIC VEHICLE BRAKE

(75) Inventors: Ralf Leiter, Mendig (DE); Ralf Erben, Kemmenau (DE); Christian Dilla, Bendorf (DE)

(73) Assignee: Lucas Automotive GmbH, Koblenz (DE)

( * ) Notice: Subject to any disclaimer, the term of this patent is extended or adjusted under 35 U.S.C. 154(b) by 689 days.

(21) Appl. No.: 12/084,002

(22) PCT Filed: Oct. 17, 2006

(86) PCT No.: PCT/EP2006/010030
§ 371 (c)(1),
(2), (4) Date: Jan. 8, 2009

(87) PCT Pub. No.: WO2007/048532
PCT Pub. Date: May 3, 2007

(65) Prior Publication Data
US 2009/0211858 A1  Aug. 27, 2009

(30) Foreign Application Priority Data
Oct. 25, 2005 (DE) .......................... 10 2005 051 082

(51) Int. Cl.
*F16D 65/14* (2006.01)
(52) U.S. Cl. ...................... 188/72.6; 188/72.9; 188/72.8
(58) Field of Classification Search ................. 188/72.6, 188/72.7, 72.8, 72.9, 106 F, 72.4
See application file for complete search history.

(56) References Cited

U.S. PATENT DOCUMENTS

| | | | | |
|---|---|---|---|---|
| 3,954,159 A * | 5/1976 | Margetts | .................... | 188/106 F |
| 4,643,278 A * | 2/1987 | Thiel et al. | .................... | 188/72.6 |
| 5,558,185 A * | 9/1996 | Tribuzio et al. | ............... | 188/72.9 |
| 5,788,024 A * | 8/1998 | Meyer | .......................... | 188/72.7 |
| 6,394,235 B1 | 5/2002 | Poertzgen et al. | | |
| 6,412,608 B1 * | 7/2002 | Mohr et al. | ................... | 188/72.9 |
| 8,061,491 B2 * | 11/2011 | Tristano et al. | ............... | 188/265 |
| 2004/0245055 A1 * | 12/2004 | Gerard et al. | ................ | 188/72.6 |

FOREIGN PATENT DOCUMENTS

| | | |
|---|---|---|
| DE | 629 031 | 4/1936 |
| DE | 674 093 | 1/1939 |
| DE | 1 977 258 | 1/1968 |
| DE | 71 08 800 | 3/1971 |
| DE | 1 775 880 | 10/1971 |
| DE | 197 32 168 C1 | 1/1999 |
| DE | 10 2004 042 309 A1 | 7/2005 |
| JP | 63030615 A * | 2/1988 |

OTHER PUBLICATIONS

Translation of Japanese Patent Application Publication Number: JP63030615, Publication Date: Feb. 9, 1988.

* cited by examiner

*Primary Examiner* — Thomas J Williams
(74) *Attorney, Agent, or Firm* — MacMillan, Sobanski & Todd, LLC

(57) ABSTRACT

A hydraulic vehicle brake having an optional locking device is described. The locking device is disposed inside a hydraulic chamber that is delimited by a brake piston. For reducing the hydraulic fluid intake, an incompressible filling body is provided inside the hydraulic chamber.

19 Claims, 1 Drawing Sheet

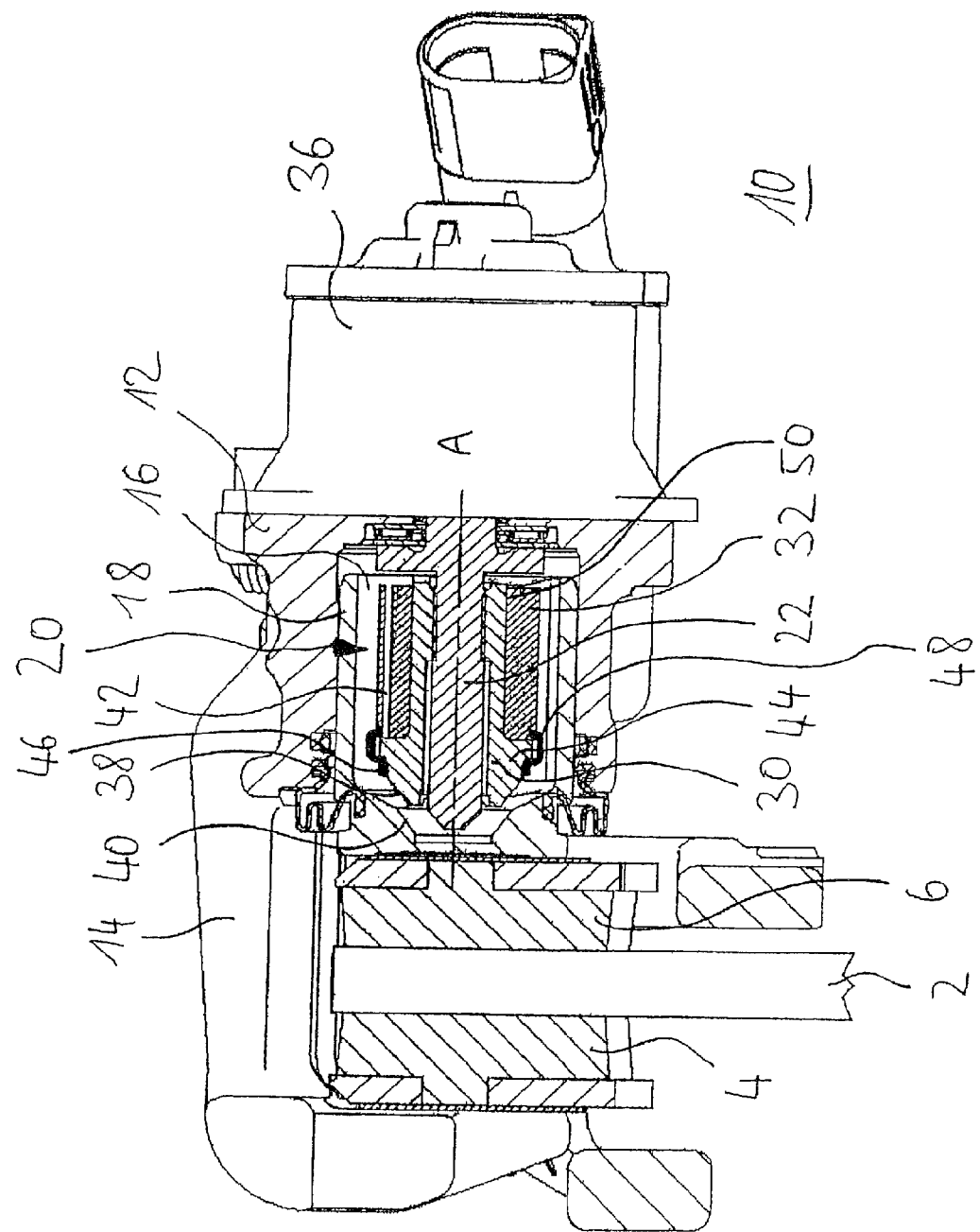

HYDRAULIC VEHICLE BRAKE

CROSS-REFERENCE TO RELATED APPLICATIONS

This application is a National Stage of International Application No. PCT/EP2006/010030 filed Oct. 17, 2006, the disclosures of which are incorporated herein by reference in their entirety, and which claimed priority to German Patent Application No. 10 2005 051 082.5 filed Oct. 25, 2005, the disclosures of which are incorporated herein by reference in their entirety.

BACKGROUND OF THE INVENTION

The invention is directed in general to vehicle brake systems. In particular the invention relates to a hydraulic vehicle brake having a hydraulic chamber and having a brake piston that delimits the hydraulic chamber.

From DE 197 32 168 A, and corresponding U.S. Pat. No. 6,394,235 B1, both of which are incorporated by reference herein in their entirety, a hydraulic vehicle brake is known, in which a friction lining by means of a brake piston may be pressed by hydraulic pressure against a brake disk in order to slow down the rotation thereof during a service braking operation. For this purpose, in a conventional manner hydraulic fluid is introduced under pressure into a hydraulic chamber, one boundary wall of which is formed by the brake piston. The pressure in the hydraulic chamber leads to a displacement of the brake piston and hence of the friction lining in the direction of the brake disk. As soon as the friction lining moves into abutment with the rotating brake disk, the vehicle is slowed down.

To allow the vehicle brake to be used not only as a service brake but also as a locking brake—also known as a parking brake, it comprises a locking device for mechanically locking the brake piston in a state, in which the friction lining is in engagement with the brake disk. In the vehicle brake known from DE 197 32 168 A, the locking device takes the form of a nut/spindle arrangement.

BRIEF SUMMARY OF THE INVENTION

The underlying feature of the invention is to indicate a hydraulic vehicle brake that may be operated with a lower hydraulic fluid volume.

This feature is achieved by a hydraulic vehicle brake having a hydraulic chamber for receiving hydraulic fluid and having a brake piston that delimits the hydraulic chamber, wherein at least one filling body is provided inside the hydraulic chamber for reducing the hydraulic fluid intake. It is optionally additionally possible to provide a mechanical locking device for the brake piston that extends into the hydraulic chamber.

The filling body may be a separate component, which is fastened mechanically inside the hydraulic chamber to a component of the vehicle brake. The filling body may be mechanically fastened in different ways. Possible types of fastening are for example slipping-on (for example in a latching or non-positive manner), the use of connection elements such as clips, or adhesion. Each filling body may be of an integral or multi-piece construction. According to a preferred variant, the filling body is made of an incompressible material (for example a non-metallic material such as plastics material or a metal material such as aluminium).

The at least one filling body may be associated with one or more components of the vehicle brake. According to a first construction, the at least one filling body is associated with the locking device and preferably accommodated in the brake piston. Particularly in the case of a locking device of a substantially cylindrical shape, the at least one filling body may be provided on the outside of the locking device. For this purpose, the filling body may be provided loosely and movably for example in a guided manner along the locking device. As an alternative to this, a fixing ring having retaining arms, which fix the filling body relative to the locking device, may be used. These approaches are advantageous for example when the locking device comprises a nut/spindle arrangement. According to a second construction, which may be combined with the first construction, the at least one filling body is associated with the brake piston. In the case of a brake piston of a substantially hollow-cylindrical shape, the at least one filling body may for example lie against the inside of the brake piston.

The at least one filling body may be of any desired shape. According to a first variant, the filling body (or an entirety of a plurality of filling bodies) has a substantially annular or hollow-cylindrical shape. According to a second variant, the filling body or each filling body is of a substantially block-shaped construction. Further variants are conceivable.

The at least one filling body may have a passage for hydraulic fluid that extends substantially along a longitudinal axis of the hydraulic chamber. The passage is designed for example as a bore or a groove.

It is further possible to stock various types of filling body of differing size (for example of differing length, differing thickness or differing diameter) in order on the basis of standard components to be able to adjust the volume of the hydraulic chamber in the works. The individual filling body or the entirety of all of the filling bodies may have a volume of approximately 0.1 to 0.5 cm$^3$. The hydraulic fluid that may be received inside the hydraulic chamber is reduced correspondingly by for example 5 to 20%.

Other advantages of this invention will become apparent to those skilled in the art from the following detailed description of the preferred embodiments, when read in light of the accompanying drawing.

BRIEF DESCRIPTION OF THE DRAWING

FIG. 1 shows an embodiment of a hydraulic vehicle brake in a part-sectional view.

DETAILED DESCRIPTION OF THE INVENTION

Here, the vehicle brake that is represented in the single FIGURE and generally denoted by 10 takes the form of a floating-caliper disk brake, which in a known manner comprises a housing 12, on which a floating caliper 14 is integrally formed. The floating caliper 14 overlaps a brake disk 2. Two friction linings 4, 6 lying opposite one another in relation to the brake disk 2 may be pressed against the brake disk 2 in order to slow down a vehicle in the case of a service braking operation or—in the case of the parking brake mode—to hold a vehicle at a standstill.

Situated in the housing 12 is a hydraulic chamber 16, in which a cylindrical brake piston 18 is accommodated sealingly and displaceably along a longitudinal axis A. The hydraulic chamber 16 is supplied from the outside with hydraulic fluid through a port, which is not represented in the drawing and is connected to a brake pressure generating unit. Upon an actuation of the brake pressure generating unit (in particular during a service braking operation), the hydraulic fluid in the hydraulic chamber 16 is pressurized so that the brake piston 18 is displaced to the left along the axis A in order to bring the friction linings 4, 6 into frictional engagement with the brake disk 2.

So that the vehicle brake 10 may not only perform the previously described function of a hydraulic service brake but may moreover also be used as a parking brake, a nut/spindle arrangement generally denoted by 20 is provided. The nut/spindle arrangement 20 comprises a spindle 22, which is disposed coaxially with the axis A and has an external thread, and a substantially sleeve-shaped nut 30, which has an internal thread that is complementary to the external thread of the spindle 22. Radially on the outside of the nut 30 a substantially hollow-cylindrical filling body 32 is disposed in a rotationally fixed manner relative to the nut 30. The construction and the function of the filling body 32 are described in more detail later.

The task of the nut/spindle arrangement 20 in the parking brake mode is to convert a rotational movement of the spindle 22 into a translational movement of the nut 30. The nut 30 in this case is prevented from rotating by means of an anti-rotation element in the form of a rib which engages therein (more precisely, into a diameter enlargement 44 of nut 30) and optionally into the filling body 32 and projects from the brake piston 18 in the direction of the axis A.

As may be seen clearly from the FIGURE, the brake piston 18 takes the form of a hollow piston that is open at the right end, and the nut/spindle arrangement 20 is situated for the most part inside the hollow brake piston 18 and hence inside the hydraulic chamber 16. To set the spindle 20 in rotation an electric motor is used, which is housed together with a reduction gear in a housing 36.

In order to lock the vehicle brake 10, first the electric motor is activated in such a way that the spindle 22 rotates in a first direction, in which as a result of unscrewing of the nut 30 a lengthening of the nut/spindle arrangement 20 is achieved. The nut 30 is therefore, in relation to the FIGURE, displaced in a translational manner to the left along the axis A and, in the process, moves with its conically constructed head end 38 into abutment with the likewise conically constructed head 40 of the brake piston 18. Upon a further rotation of the spindle 22 in the first direction of rotation, the nut 30 then presses the brake piston 18 to the left, with the result that the brake piston 18 presses the friction lining 6 against the brake disk 2. Because of the vehicle brake 10 being designed as a floating caliper brake, the opposite friction lining 4 is also taken up by this movement of the friction lining 6 and pressed against the brake disk 2. Once this state has been attained, the electric motor may be switched off. As the thread pairing between the spindle 22 and the nut 30 is of a self-locking design, the attained position of the nut/spindle arrangement 20 is maintained even after the electric motor has been switched off.

To release the parking brake, the electric motor is activated in such a way that the spindle 22 is rotated in the opposite direction. The steps described above are then completed in the reverse order.

In the present embodiment, the brake pressure in the parking brake mode is generated exclusively by means of the electric motor. It would however also be possible to assist the build-up of brake pressure in the parking brake mode by means of a hydraulic pump. In this case, the task of the mechanical locking device is limited to merely maintaining a hydraulically generated brake pressure. In this case, the electric motor may be of smaller dimensions.

The already mentioned filling body 32 has the task of reducing the volume of the hydraulic chamber 16 and hence the hydraulic fluid intake capacity of the hydraulic chamber 16. This approach makes it possible to reduce the hydraulic fluid volume in the brake system as a whole by typically 10 to 15%. Such a procedure is advantageous particularly in the case of locking devices that have a nut/spindle arrangement, because such locking devices do not fill the brake piston to the same extent as for example locking devices that contain a "ball-and-ramp" mechanism. In the case of the last-mentioned locking devices, there is namely as a rule a readjustment mechanism accommodated in the brake piston that practically fills the entire brake piston space. Nevertheless, parking brake devices based on the "ball-and-ramp" principle might also be combined with the approach proposed here of introducing at least one filling body into the hydraulic chamber.

The filling body 32 represented in the single FIGURE is a single hollow-cylindrical element, which is made of an incompressible plastics material that is lightweight compared to the metal material of the locking device. The filling body 32 may however alternatively be made of a low-density metal material such as aluminium.

The filling body 32 is disposed radially on the outside of a slimmed-down portion 50 of the substantially cylindrical nut/spindle arrangement 20. More precisely, the filling body 32 in the embodiment is fastened by means of a fixing ring 46 to the nut/spindle arrangement 20. The fixing ring 46 has a plurality of retaining arms 48, which extend beyond the diameter enlargement 44 and are in latching engagement with the filling body 32. The fixing ring 46 itself is fastened by means of a driving fit onto a step of the conically formed head end 38 of the nut 30. Instead of the embodiment represented in the single FIGURE, the filling body 32 might be disposed loosely on the nut/spindle arrangement 20. It would then be conceivable for the nut/spindle arrangement 20 to act as a guide for a filling body 32 movable in axial direction relative to the nut/spindle arrangement 20.

In the embodiment, the filling body 32 has a plurality of passages for the hydraulic fluid. The passages take the form of bores 42 that extend over the entire length of the filling body 32 and parallel to the axis A. The bores 42 provided in the filling body 32 open out into corresponding passages in the diameter enlargement 44 in order to enable an improved fluid communication between the front head region 40 of the brake piston 18 and the rear opening thereof. In a departure from the form of construction represented in the FIGURE, the passages of the filling body 32 might alternatively be realized between ribs that are formed radially on the outside of the filling body 32.

According to an embodiment that differs from the embodiment represented in the FIGURE, in addition to or instead of the filling body 32 a filling body is fastened or disposed loosely radially on the inside of the brake piston 18. The filling body associated with the brake piston 18 may be of a substantially hollow-cylindrical design in order to allow the nut/spindle arrangement 20 to be accommodated in the interior of the filling body.

In the embodiment, the filling body 32 accommodated in the brake piston 18 is of an integral construction and has a volume of approximately 0.1 to 0.2 $cm^3$. Naturally, the filling body 32 might alternatively be of a multi-piece construction and have a higher or lower volume. By means of filling bodies of variable size, the intake of hydraulic fluid volume inside the hydraulic chamber 16 may be adjusted in the works.

The embodiment refers to a hydraulic vehicle brake having a mechanical locking device extending into the hydraulic chamber. In a departure from this embodiment, filling bodies may alternatively be used in connection with hydraulic vehicle brakes elsewhere and in particular with hydraulic vehicle brakes that do not comprise a mechanical locking device. In this case, one or more filling bodies may be provided for example lying at the inside of a hollow-cylindrical brake piston, similar to that shown in the FIGURE.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. Hydraulic vehicle brake comprising:
a hydraulic chamber for receiving hydraulic fluid,
a brake piston that delimits the hydraulic chamber,
a mechanical locking device including a spindle having an externally threaded portion that engages an internally threaded portion provided on a nut supported thereon, wherein rotation of the spindle causes the nut to move relative to the spindle into engagement with the brake piston, and
at least one filling body provided about the spindle inside the hydraulic chamber for reducing the hydraulic fluid intake and fixed relative to the nut for movement therewith.

2. Vehicle brake according to claim 1, wherein the at least one filling body is a separate component that is fastened mechanically inside the hydraulic chamber to the locking device of the vehicle brake.

3. Vehicle brake according to claim 1, wherein the at least one filling body is made of a material that is lightweight compared to a material used to form the locking device.

4. Vehicle brake according to claim 1, wherein the at least one filling body is fastened to the locking device by means of a connection element, in particular by means of a fixing ring having retaining arms.

5. Vehicle brake according to claim 1, wherein the filling body or an entirety of a plurality of filling bodies is of a substantially annular or hollow-cylindrical shape.

6. Vehicle brake according to claim 1, wherein the at least one filling body has a passage for hydraulic fluid that extends substantially along a longitudinal axis of the hydraulic chamber.

7. Vehicle brake according to claim 1, wherein the at least one filling body is made of an incompressible material.

8. Vehicle brake according to claim 1, wherein the at least one filling body is made of an incompressible plastics material.

9. Vehicle brake according to claim 1, wherein the at least one filling body is made of made of a low-density metal material such as aluminium.

10. Vehicle brake according to claim 1, wherein the at least one filling body is attached to the nut.

11. Vehicle brake according to claim 1, wherein the spindle and the nut are made of a metal material, and wherein the at least one filling body is made of an incompressible plastics material that is lightweight compared to the metal material of the spindle and the nut.

12. Vehicle brake according to claim 1, wherein the spindle has a thread, and wherein the nut has a thread that is complementary to the thread of the spindle such that rotation of the spindle causes the nut to move relative to the spindle into engagement with the brake piston.

13. Vehicle brake according to claim 1, wherein the volume of the hydraulic fluid that may be received inside the hydraulic chamber is reduced by the filling body in the range of from about 5% to about 20%.

14. Vehicle brake according to claim 1, wherein the volume of the hydraulic fluid that may be received inside the hydraulic chamber is reduced by the filling body in the range of from about 10% to about 15%.

15. An actuator for a brake comprising:
a housing having a hydraulic chamber;
a hollow piston disposed within the hydraulic chamber and adapted for axial movement relative to the housing;
a hollow filling body disposed within the hollow piston and the hydraulic chamber;
a nut disposed within the hollow filling body and having an internally threaded portion; and
a spindle having an externally threaded portion that engages the internally threaded portion of the nut such that rotation of the spindle causes axial movement of the nut;
wherein the hollow piston can be moved axially relative to the housing in response to either of (1) pressurized fluid supplied to the hydraulic chamber or (2) axial movement of the nut.

16. The actuator for a brake according to claim 15, wherein the volume of the hydraulic fluid that may be received inside the hydraulic chamber is reduced by the filling body in the range of from about 5% to about 20%.

17. The actuator for a brake according to claim 15, wherein the volume of the hydraulic fluid that may be received inside the hydraulic chamber is reduced by the filling body in the range of from about 10% to about 15%.

18. The actuator for a brake according to claim 15, wherein the filling body is fixed relative to the nut for movement therewith.

19. The actuator for a brake according to claim 18, wherein the filling body is secured to the nut.

* * * * *